United States Patent
Jung et al.

(10) Patent No.: US 7,848,365 B2
(45) Date of Patent: Dec. 7, 2010

(54) APPARATUS FOR RECEIVING CABLE TV BROADCASTING PROGRAM, AND MULTIPLEXER AND DE-MULTIPLEXER THEREOF

(75) Inventors: Joon-Young Jung, Daejeon (KR); Eun-Jung Kwon, Daejeon (KR); O-Hyung Kwon, Daejeon (KR); Soo-In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1212 days.

(21) Appl. No.: 11/452,486

(22) Filed: Jun. 13, 2006

(65) Prior Publication Data

US 2007/0074256 A1    Mar. 29, 2007

(30) Foreign Application Priority Data

Sep. 27, 2005    (KR) .................... 10-2005-0090065

(51) Int. Cl.
*H04J 3/04* (2006.01)
(52) U.S. Cl. ..................... 370/532; 370/535
(58) Field of Classification Search ............. 370/532, 370/535
See application file for complete search history.

(56) References Cited

U.S. PATENT DOCUMENTS

| | | | |
|---|---|---|---|
| 2002/0067745 A1* | 6/2002 | Coupe et al. ............... | 370/535 |
| 2002/0118680 A1* | 8/2002 | Lee .......................... | 370/389 |
| 2003/0206605 A1* | 11/2003 | Anderson ................... | 375/355 |
| 2004/0168203 A1* | 8/2004 | Seo et al. .................... | 725/135 |
| 2004/0170162 A1* | 9/2004 | Hung ........................ | 370/389 |
| 2005/0091697 A1* | 4/2005 | Tanaka et al. ............... | 725/131 |
| 2006/0123443 A1* | 6/2006 | Hamilton et al. ............ | 725/32 |
| 2007/0154184 A1* | 7/2007 | Hatanaka et al. ............ | 386/98 |
| 2007/0297461 A1* | 12/2007 | Takashimizu et al. ....... | 370/535 |
| 2009/0147954 A1* | 6/2009 | Pinder et al. ................ | 380/216 |

FOREIGN PATENT DOCUMENTS

| KR | 1999-0072064 | 9/1999 |
|---|---|---|
| WO | WO 02/093921 | 11/2002 |

* cited by examiner

*Primary Examiner*—Andrew Lee
(74) *Attorney, Agent, or Firm*—Blakely, Sokoloff, Taylor & Zafman LLP (57) ABSTRACT

Provided are an apparatus for receiving cable broadcasting programs and a multiplexer and a de-multiplexer thereof for reducing data amount processed in a Cable CARD and for correcting synchronization of descrambled data stream. The apparatus includes: a multiplexing unit for filtering a broadcasting stream to select only programs selected by a viewer and multiplexing the selected programs; a conditional-access processing unit for receiving the multiplexed streams and processing the multiplexed streams for conditional access (descrambling); and a de-multiplexing unit for de-multiplexing the multi stream from the conditional-access processing unit and correcting a program clock reference (PCR).

12 Claims, 5 Drawing Sheets

APPARATUS FOR RECEIVING CABLE TV BROADCASTING PROGRAM, AND MULTIPLEXER AND DE-MULTIPLEXER THEREOF

FIELD OF THE INVENTION

The present invention relates to an apparatus for receiving cable broadcasting programs and a multiplexer and a de-multiplexer thereof for reducing data amount processed in a Cable CARD by multiplexing only streams for a predetermined program selected by a viewer at each channel and transmitting the multiplexed stream to a Cable CARD without multiplexing and transmitting all of channel streams for transmitting multi-steams including broadcasting data stream of channels in an interfaced between a cable TV receiver or a set-top terminal which have a plurality of tuners and a QAM demodulator employing an OpenCable standard and a Cable CARD module processing received data for conditional access.

DESCRIPTION OF RELATED ARTS

The OpenCable standard is an open standard in US, which defines specifications for isolating an artificial intelligence cable TV card from a set-top box. The OpenCable standard is selected as a standard for Korea cable broadcasting.

In the digital cable broadcasting, various methods were introduced to provide pay-services. The most common method to provide the pay-services is a scramble/descramble method. That is, a transmitter scrambles broadcasting data and transmits the scrambled broadcasting data to a receiver. And, a receiver having a right of receiving the broadcasting data is only allowed to descramble the broadcasting data. In order to descramble, the receiver having the right has a security and an access mechanism.

The security and the access mechanism may be a Cable CARD detachable from a cable broadcasting receiver and operated in response to a control signal of a service provider.

Recently, there were many TV receivers introduced, which processes more than two broadcasting channels at the same time. Such a function to receive a plurality of channels at the same time is required to record one of the received channels while watching other. Also, it is required for a picture-in-picture display. Furthermore, it supports a home-networking system that provides different programs to a plurality of TVs or corresponding displays from a single TV receiver.

In order to receive and to process more than two pay-broadcasting channels at the same time, a conditional receiving module of the TV receiver must process mess amount of broadcasting data to descramble the received broadcasting data. As a result, operations of the secure and access mechanism become very complicated.

That is, a Cable CARD descrambles the received multi-streams and outputs the descrambled multi-streams. Then, a receiver receives the descrambled multi-streams from the Cable CARD, de-multiplexes the descrambled multi-streams and distributes the de-multiplexed streams to a corresponding audio/video (A/V) decoder or a digital video recorder (DVR). To reduce the amount of data processed, a filtering is performed on each of channels and filtered streams are multiplexed to a single stream. However, such a way of reducing the amount of data to process may break synchronization between packets (MPEG-2 TS packets) in the de-multiplexed and distributed data stream.

SUMMARY OF THE INVENTION

It is, therefore, an object of the present invention to provide an apparatus for receiving cable broadcasting programs and a multiplexer and a de-multiplexer thereof for reducing data amount processed in a Cable CARD by multiplexing only streams for a predetermined program selected by a viewer at each channel and correcting synchronization of descrambled data stream through a Cable CARD while data stream is de-multiplexed in a transmitter that transmits the multiplexed stream to a Cable CARD for transmitting multi-steams including broadcasting data stream of channels in an interfaced between a cable TV receiver or a set-top terminal which have a plurality of tuners and a QAM demodulator employing an OpenCable standard and a Cable CARD module processing received data for conditional access.

In accordance with an aspect of the present invention, there is provided an apparatus for receiving a cable broadcasting program including: a multiplexing unit for filtering a broadcasting stream to select only programs selected by a viewer and multiplexing the selected programs; a conditional-access processing unit for receiving the multiplexed streams and processing the multiplexed streams for conditional access (descrambling); and a de-multiplexing unit for de-multiplexing the multi stream from the conditional-access processing unit and correcting a program clock reference (PCR).

In accordance with another aspect of the present invention there is provided a multiplexing unit for an apparatus of receiving a cable broadcasting program, the multiplexer including: a transport stream (TS) receiving unit for transforming broadcasting stream of channels selected by a viewer to a data block of a predetermined type TS packet by synchronizing at a required operating clock; a packet identifier (PID) filtering unit for receiving the predetermined type TS packet data outputted from the TS receiving unit, analyzing information in a packet identifier (PID) field in a header of the predetermined type TS packet, outputting packets of programs selected by a viewer and dumping remained packets; a pre-header generating unit for adding a predetermine side of a pre-header to the TS packets passed through the PID filtering unit to create a predetermined size of a packet; a local time stamp generating unit for generating a time stamp value required for a location time stamp field (LTS) of the pre-header generating unit; an outputting unit for receiving the predetermined size of the packets outputted from the pre-header generating unit and outputting the received packets in a first-in first-out (FIFO) fashion; and an output controlling unit for controlling the outputting unit not to output packets to be crashed one another.

In accordance with still another aspect of the present invention, there is provided a de-multiplexing unit for an apparatus of receiving cable broadcasting program, the de-multiplexing unit including: a pre-header checking unit for checking a field of a pre-header in a descrambled transport stream (TS); an inputting unit for storing packets outputted from the pre-header checking unit in a FIFO fashion; an output rate correcting unit for receiving data storing information from the inputting unit, receiving output data rate information of a corresponding channel from a CPU of the apparatus of receiving a cable broadcasting program and deciding a time to output packets; a Null inserting unit for outputting a predetermined size of a Null packet in response to a Null-signal from the output rate correcting unit; and a program clock reference (PCR) correcting unit for correcting a program clock reference value of a packet having a PCR information among the final-outputted packets from the de-multiplexing unit and deleting the pre-header thereof.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, an apparatus for receiving a cable TV broadcasting program and a multiplexer and a de-multiplexer thereof in accordance with a preferred embodiment of the present invention will be described in more detail with reference to the accompanying drawings.

Figure 1:
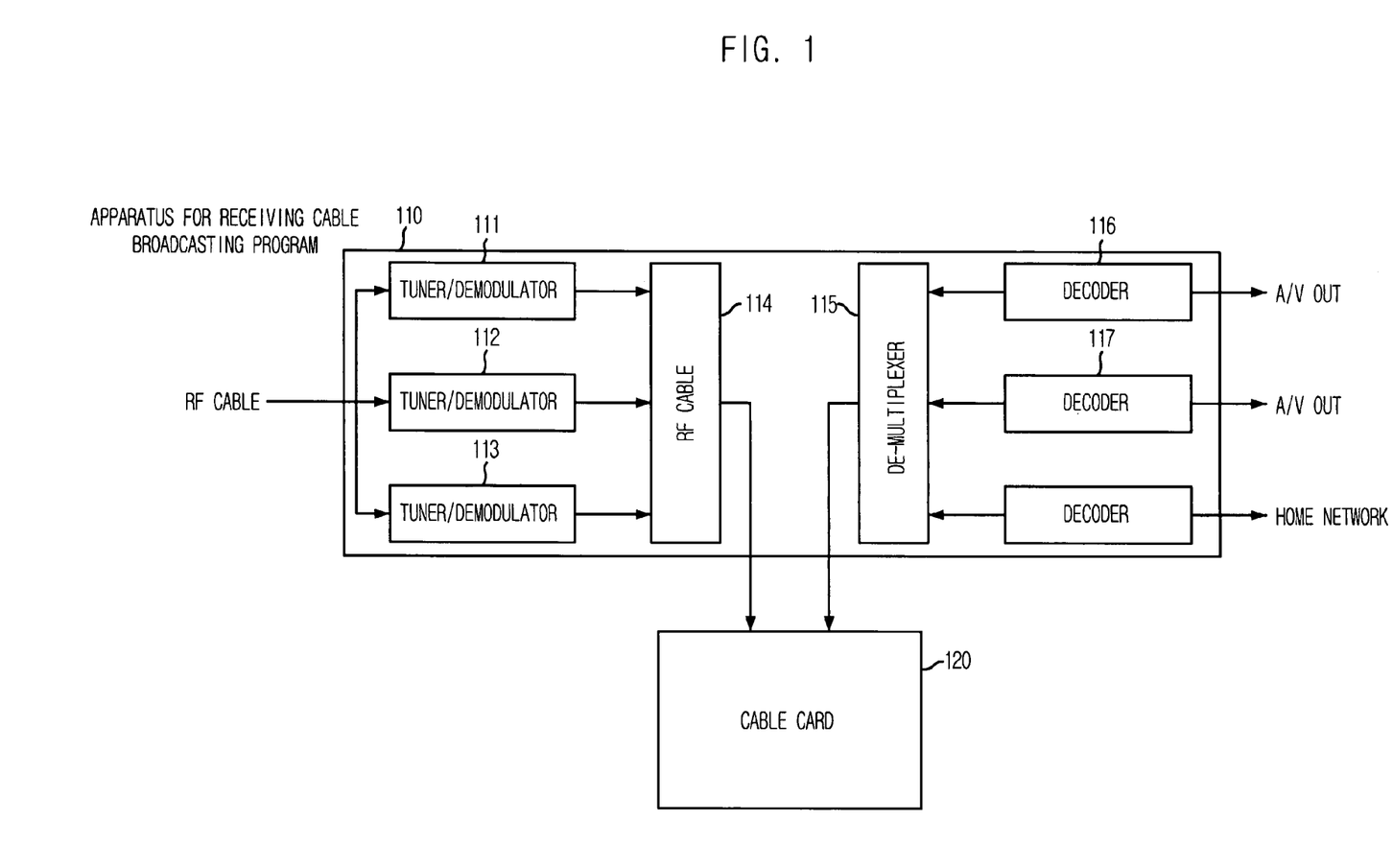
FIG. 1 is a block diagram showing an interfacing between a cable broadcasting receiver and a Cable CARD to receive a plurality of broadcasting programs at the same time.

FIG. 1 is a block diagram showing an interfacing between a cable broadcasting receiver and a Cable CARD to receive a plurality of broadcasting programs at the same time.

The OpenCable standard defines interfaces between a Cable CARD (CableCARD™) having a security and access mechanism and a digital cable broadcasting receiver that receives a polarity of broadcasting channels at the same time.

As shown in FIG. 1, the cable broadcasting receiver 110 includes tuner/demodulators 111, 112 and 113, and a multiplexer 114. The tuner/demodulators 111, 112 and 113 receives a plurality of broadcasting channels, demodulates the received broadcasting channels and outputs broadcasting streams (MPEG-2 transport streams) of the received broadcasting channels. The multiplexer 114 multiplexes the outputted broadcasting streams, processes the multiplexed stream for conditional access and outputs the processed stream to the Cable CARD 120.

The Cable CARD 120 descrambles the multiplexed broadcasting stream in response to a control signal and outputs the descrambled signal to a de-multiplexer 114 of the cable broadcasting receiver 110. The de-multiplexer 114 de-multiplexes the descrambled broadcasting stream into broadcasting streams of each of target channels and output the broadcasting streams to MPEG decoders 116 and 117, and a Home network.

The OpenCable standard defines an interface between the cable broadcasting receiver 110 and the Cable CARD 120 to support a 200 Mbps of a bandwidth for multiplexed broadcasting stream. Such a bandwidth can process up to 5 of 256 QAM modulated channels or 6 of 64 QAM modulated channels. The multiplexer 114 of the cable broadcasting receiver 110 inserts a 12-byte of pre-header into the multiplexed broadcasting stream to distinguish each broadcasting stream from others. The insertion of the pre-header will be described in more detail with reference to FIG. 2.

Figure 2:
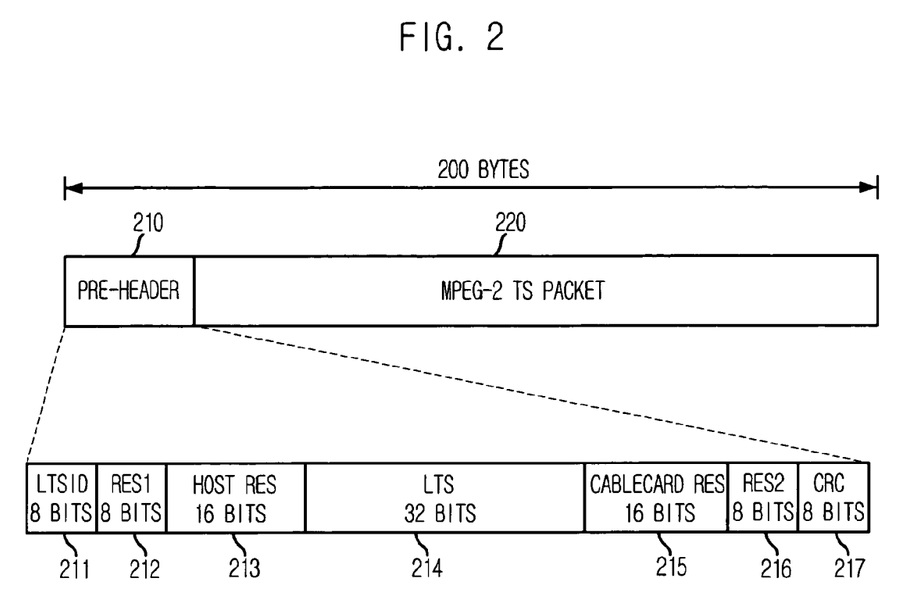
FIG. 2 shows a pre-header to distinguish a channel from others in a general cable broadcasting receiver.

FIG. 2 shows a pre-header to distinguish a channel from others in a general cable broadcasting receiver. That is, a 12-byte pre-header is shown to distinguish each channel while multiplexing a plurality of channel data streams.

As shown in FIG. 2, a 200-byte of data packet is created to include a 12-byte pre-header 210 front of a 188-byyte MPEG-2 transport stream (TS) 220.

The pre-header 210 includes a local transport stream ID (LTSID) field 211 is an identification to distinct broadcasting streams according to each channel. That is, LTSID field 211 has a different value from other channel's broadcasting stream.

The pre-header 210 also includes a RES1 field 212 and a RES2 field 216 having a value of "0X00" as a reserve field.

The pre-header 210 includes a HOST_reserved field 213 and it used for a predetermined purpose in a receiver.

The pre-header 210 further includes a local time stamp 214. The local time stamp 214 is a 32-bit field assigned to a receiver for managing a MPEG timing.

A CableCard_reserved field 215 of the pre-header 210 is a 16-bit field and is used as a predetermined purpose in a Cable CARD.

A cycle redundancy check (CRC) field 218 is a 8-bit field and is assigned to determine whether values in the pre-header 210 is changed or not after passing through the Cable CARD.

As described above, data of programs selected by a viewer do not fully occupy 200 Mbps of bandwidth when multiplexed broadcasting stream is transmitted at 200 Mbps bandwidth in the interface defined by the OpenCard standard. For example, if 5 of 256 QAM channels are transmitted at the same time, 200 Mbps bandwidth is fully occupied thereby because each channel thereof occupies about 40 Mbps bandwidth. Herein, there may be several programs in a 40 Mbps data transmitted through each channel. Normally, a HD-level program occupies about 20 Mbps bandwidth, a SD-level program occupies about 4 to 6 Mbps bandwidth. Therefore, the 40 Mbps bandwidth may transmit two HD-level programs or 10 SD-level programs at the same time. If a viewer selects 5 HD-level programs, a total data bandwidth required for the selected HD-level programs is about 100 Mbps. Or, if a viewer selects 5 SD-level programs, a total data bandwidth required for the selected SD-level programs is about 20 to 30 Mbps. That is, a multiplexed broadcasting stream transmitted at an interface of a Cable CARD and a receiver may include server other programs which are not selected by a viewer.

In the present invention, a multiplexer of a cable broadcasting receiver filters a MPEG-2 transport stream to select programs selected at each channel by a viewer, multiplexes the filter programs only to create a multiplexed broadcasting stream and transmits the multiplexed broadcasting stream to the Cable CARD. Therefore, an amount data processed in the Cable CARD is reduced according to the present invention. Also, the present invention corrects a broken synch of a MPEG-2 transport stream while filtering in a de-multiplexer. That is, the synch of MPEG-2 TS packet may be broken while filtering in a multiplexer due to a jitter generated at a program clock reference (PCR) in each channel stream when each of channel stream is distributed to an MPEG decoder, a digit video recorder (DVR) after de-multiplexing the multiplexed broadcasting stream in the de-multiplexer in the receiver. Therefore, the packet synch must be restored through a program clock reference correction in the de-multiplexing to reduce a bandwidth of a multiplexed stream through a filtering.

Figure 3:
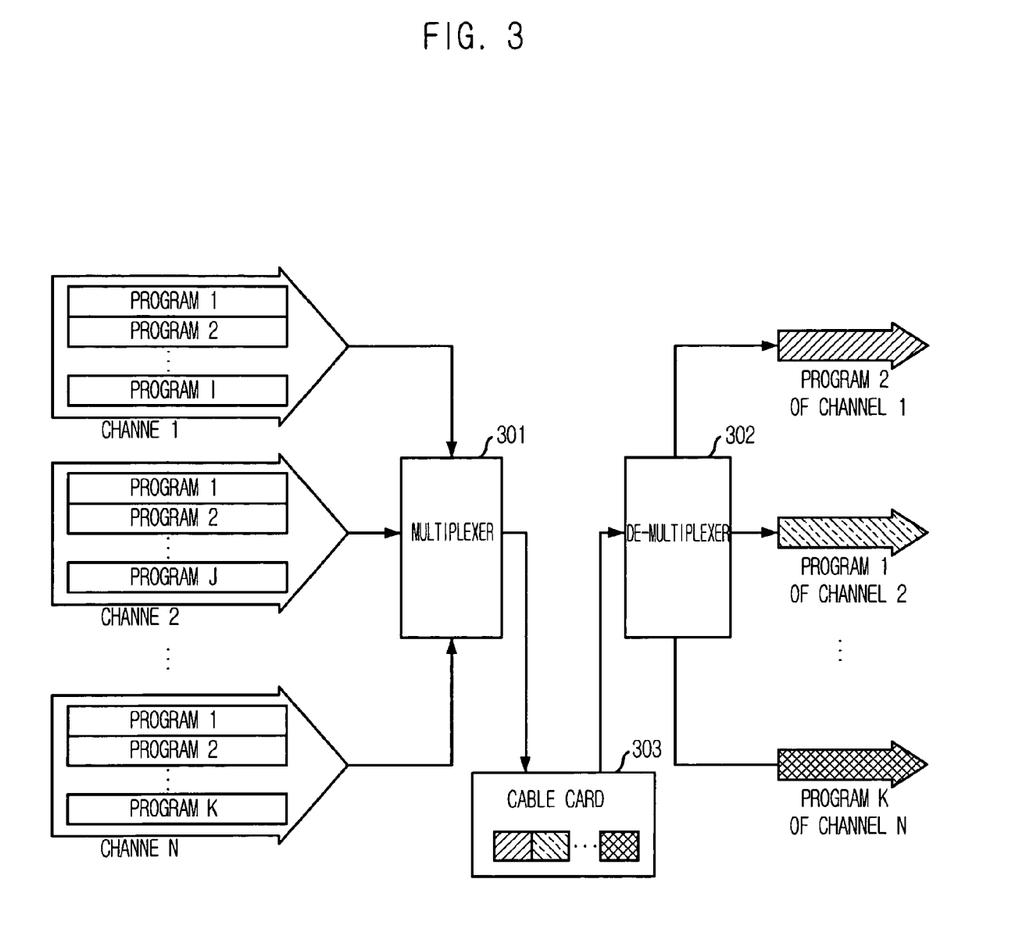
FIG. 3 is a block diagram illustrating an apparatus for receiving a cable broadcasting program in accordance with a preferred embodiment of the present invention.

FIG. 3 is a block diagram illustrating an apparatus for receiving a cable broadcasting program in accordance with a preferred embodiment of the present invention. It assumes that a view selects a plurality of programs included in N channels.

As shown in FIG. 3, an apparatus for receiving a cable broadcasting program according to the present invention includes a multiplexer 301 for filtering a broadcasting stream to select programs selected by a viewer and multiplexing the selected programs, a Cable CARD 202 for receiving the multiplexed streams from the multiplexer 301 and processing the multiplexed streams for conditional access, and a de-multiplexer 302 for de-multiplexing the multiplexed stream from the Cable CARD 303 and correcting a program clock reference.

Each of N tuner/demodulators outputs broadcasting streams to the multiplexer 301. The multiplexer 301 filters the broadcasting streams to select programs selected by a viewer, for example, a second program 2 of a first channel 1, a first program 1 of a second channel 2, and a $k^{th}$ program K of a $N^{th}$ channel N. Then, the broadcasting streams for the selected programs are multiplexed and outputted to the Cable CARD 303.

The Cable CARD 303 descrambles the multiplexed stream and outputs the descrambled stream to the de-multiplexer 302. The de-multiplexer 302 distributes each of program streams through a de-multiplexing and a program clock reference correction.

Figure 4:
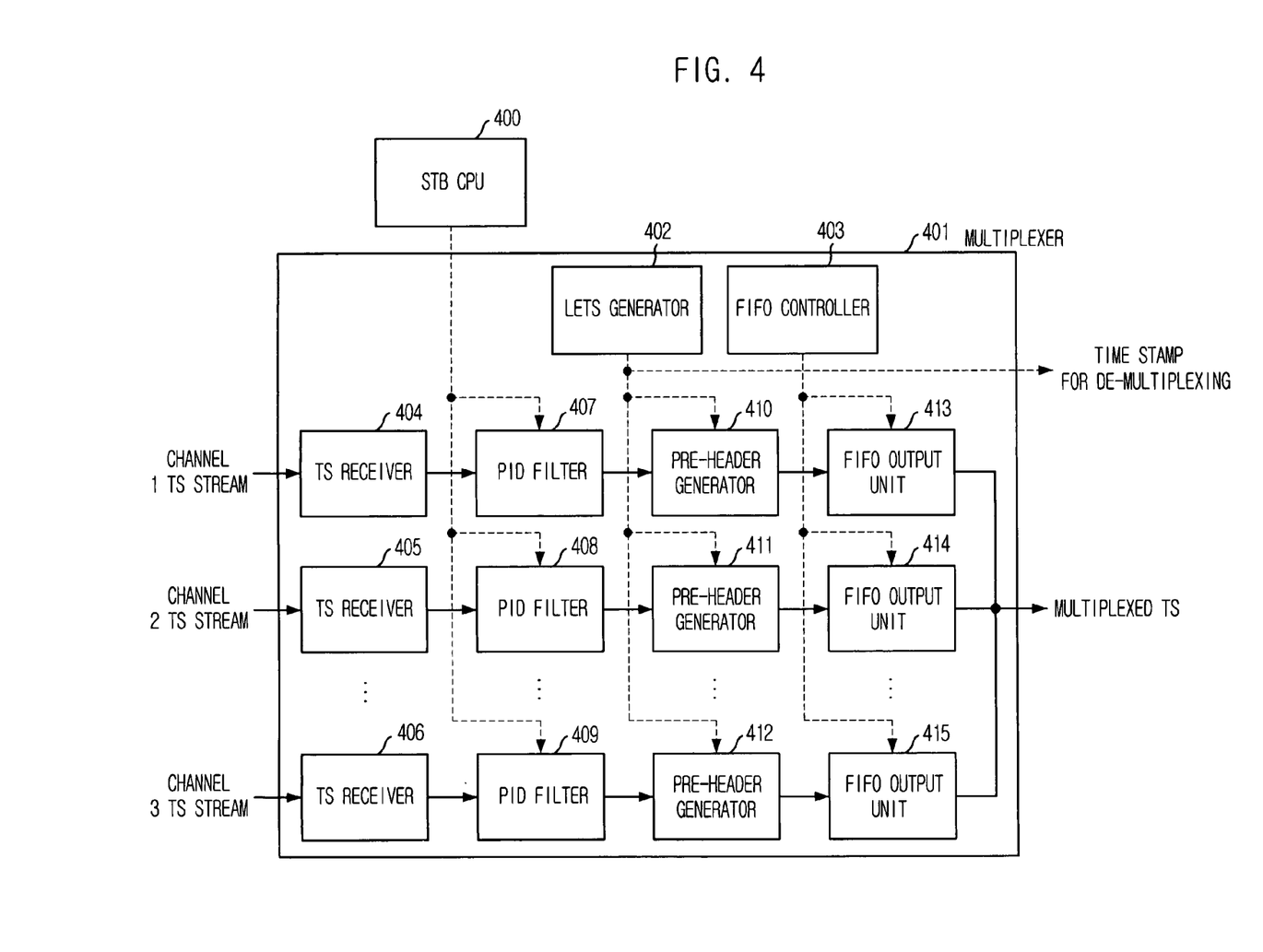
FIG. 4 is a block diagram showing a multiplexer for receiving a cable broadcasting program in accordance with a preferred embodiment of the present invention.

FIG. 4 is a block diagram showing a multiplexer for receiving a cable broadcasting program in accordance with a preferred embodiment of the present invention.

As shown in FIG. 4, the multiplexer according to the present embodiment includes:

a plurality of transport stream (TS) receivers 404, 405, 406 for transforming broadcasting stream of channels selected by a viewer to a data block of a 188-byte TS packet again by synchronizing at a required operating clock;

a plurality of packet identifier (PID) filters 407, 408 and 409 for receiving the MPEG-2 TS packet data outputted from the TS receivers 404, 405 and 406, analyzing information in a packet identifier (PID) field in a first 4-byte of the 188-byte MPEG-2 TS stream picketer header, outputting packets of programs selected by a viewer and dumping remained packets;

a plurality of pre-header generators 410, 411, 412 for adding a 12-byte pre-header to the TS packets passed through the PID filters 407, 408 and 409 to create 200-byte packet;

a local time stamp generator 402 for generating a time stamp value required for a location time stamp field 214 of the pre-header generators 410, 411 and 412;

a plurality of FIFO output units 413, 414 and 415 for receiving the 200-bypte packets from the pre-header generators 410, 411 and 412 and outputting the received packets in a first in first out (FIFO) fashion; and a FIFO controller 403 for controlling packets outputted from the FIFO output units 413, 414 and 415 not to be crashed one another.

When the TS receivers 404, 405 and 406 of the multiplexer 401 receive broadcasting streams of channels selected by a viewer, the TS receivers 404, 405 and 406 transforms the received broadcasting steams to data blocks of 18-bypt MPEG-2 TS packet through synchronizing at a required operating clock.

The PID filters 407, 408 and 409 receive MPEG-2 TS packet data outputted from each of the TS receivers 404, 405 and 406 and analyzes information in the PID field at the first 4-byte of the 188-byte MPEG-2 TS packet header. Then, the PID filters 407, 408 and 409 outputs the packets of the programs selected by a viewer and damps the remained packets. Herein, information about the programs selected by a viewer may obtained though receiving a "Program_number" of selected program in a corresponding channel from a STB CPU 400. The "Program_number" is identical to a value in a program association table (PAT) transmitted within a corresponding channel and obtained through service information (SI) transmitted to an out-of-band channel.

The PID filters 407, 408 and 409 are operated as follows.

At first, the PID filters 407, 408 and 409 receives "Program_number" values of selected programs according to corresponding channels from the STB CPU 400. Then, the PID filters 407, 408 and 409 finds a TS packet having the program association table (PAT) among the inputted MPEG-2 TS stream which is a packet having 0 of PID.

Then, the PID filters 407, 408 and 409 analyze the PAT and obtain a PID of a program map table (PMT) according to the "Program_number" of selected programs.

The PID filters 407, 408 and 409 finds a TS packet having the PID of the PMT from the MPEG-2 TS.

The PID filters 407, 408, 409 obtain a packet identifier (PID) of each TS packet including a video/audio elementary stream of selected program by analyzing the PMT.

The PID filters 407, 408 and 409 obtain a packet PID of an entitlement control message (ECM) by analyzing a CA descriptor in the PMT.

The PID filter 407, 408 and 409 passes the packets having the PID for transmitting the video/audio elementary stream, the packet having the PID for ECM and the packets having "0" or "1" as the PID which transmit the ECM, the PAT and the conditional access table (CAT) for multiplexing. Then, the PID filters 407, 408 and 409 delete remained packets.

The TS packets passed through the PID filters 407, 408 and 409 are outputted as a form of 200-byte packet with the 12-byte of pre-header as shown in FIG. 2. Herein, the time stamp value of a local time stamp field 214 is received from the local time stamp generator 402. The local time stamp generator 402 is configured of a 32-bit counter and is operated based on a 27 MHz which is a MPEG reference clock. And, the generated time stamp (counter) value is transmitted to be used in the de-multiplexer.

The 200-byte packets outputted from the pre-header generators 410, 411 and 412 are inputted to the FIFO output units 413, 414 and 415. Then, the packets are finally outputted in sequence. Herein, the FIFO output units 413, 414 and 415 receive a control signal from the FIFO controller 403 and output the packets according to the control signal not to be crashed with another. That is, each of the FIFO output units 413, 414 and 415 transmits a full-signal denoting that corresponding output unit is full of the packet to the FIFO controller 403 after receiving the 200 byte packet is completely received. Also, each of the FIFO output units 413, 414 and 415 transmits an empty-signal denoting that corresponding output unit is empty to the FIFO controller 403 after outputting the 200-byte packets completely.

The FIFO controller 403 transmits an output-signal to one of the FIFO output units 413, 414 and 415 that sends the full-signal for outputting the packet, and waits until receiving the empty-signal from the one. Herein, the FIFO controller 403 waits for a first FIFO output unit to transmit the empty-signal although the FIFO controller 403 receives full-signals from other FIFO output units. Then, the FIFO controller 403 transmits the output-signal to a second FIFO output unit after receiving the empty-signal from the first FIFO output unit. As described above, the FIFO controller 403 prevents the packets outputted from the FIFO output units from being crashed one another. Such outputted packets are inputted to the Cable CARD 303 and descrambled. Then, the descrambled packets are outputted to the de-multiplexer 302.

Figure 5:
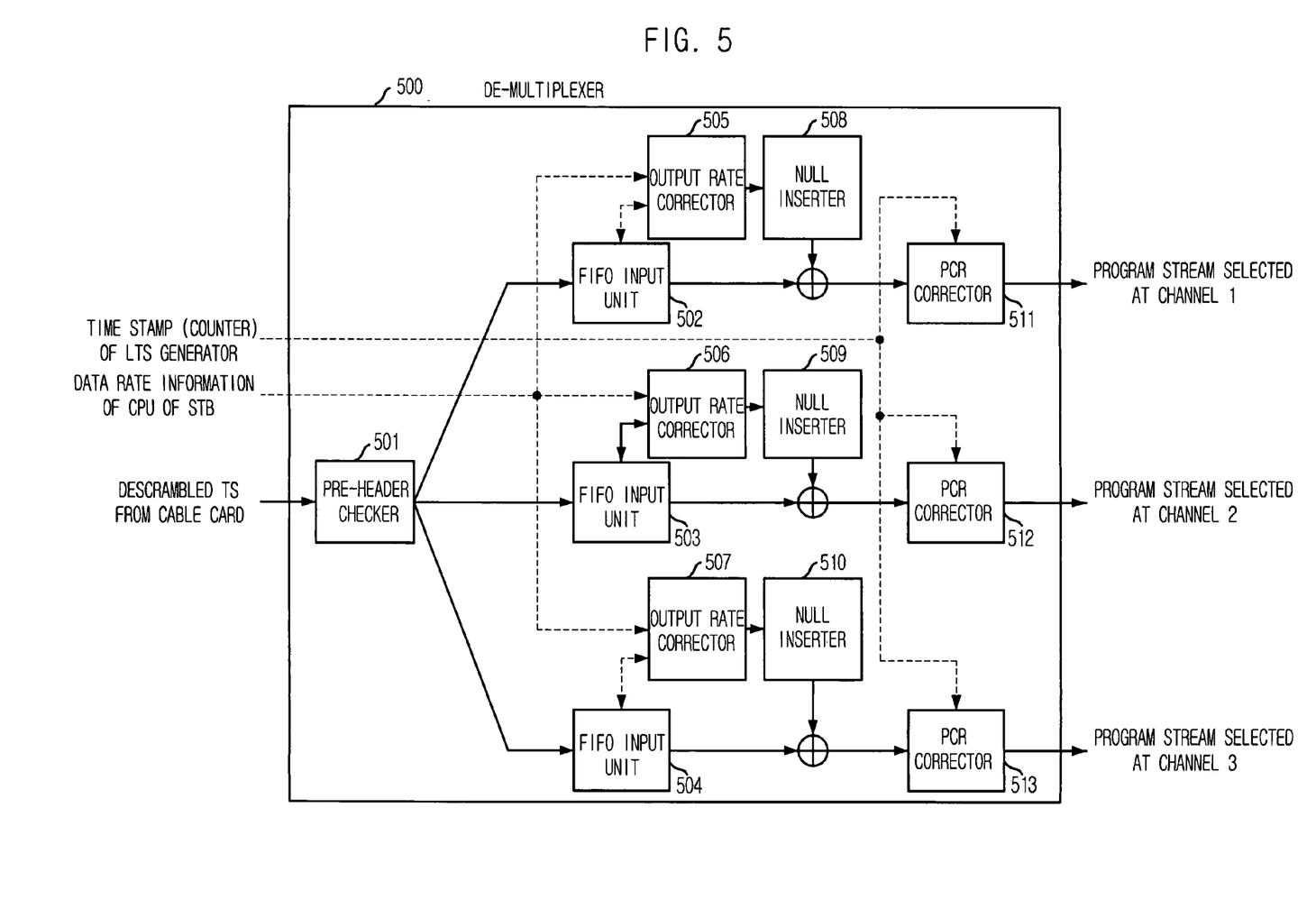
FIG. 5 is a block diagram showing a de-multiplexer in an apparatus for receiving cable broadcasting programs in accordance with a preferred embodiment of the present invention.

FIG. 5 is a block diagram showing a de-multiplexer in an apparatus for receiving cable broadcasting programs in accordance with a preferred embodiment of the present invention.

Referring to FIG. 5, the de-multiplexer 500 according to the present embodiment includes: a pre-header checker 501 for checking a LTSID field 211 of a pre-header in a descrambled TS inputted from the Cable CARD 303; a plurality of FIFO input units 502, 503 and 504 for storing packets outputted from the pre-header checker 501 in a FIFO fashion; a plurality of output rate correctors 505, 506, 507 for receiving data storing information from the FIFO input units 502, 503 and 504, receiving output data rate information of a corresponding channel from a CPU of a cable broadcasting receiver and deciding a time to output the input packets; a plurality of Null inserters 508, 509 and 510 for outputting a 200-byte Null packet in response to a Null-signal to output the Null packet from the output rate correctors 505, 5056 and 507; and a plurality of program clock reference correctors 511, 512 and 513 for correcting a program clock reference value of a packet having a PCR information among the final-outputted packets and deleting the 12-byte pre-header.

When the de-multiplexer 500 receives the descrambled TS from the Cable CARD 303, the pre-header checker 501 checks the LTSID field 211 of the pre-header of each TS and outputs them to corresponding FIFO input units 502, 503 and 504.

The FIFO output units 502, 503 and 504 send a full-signal denoting that one packet including a pre-header is completely inputted to the output rate correctors 505, 506 and 507 and outputs the packet when receiving an output-signal from the output rate correctors 505, 506 and 507.

The output rate correctors 505, 506 and 507 decide a time of outputting a packet by receiving data rate information of corresponding channel from a central processing unit (CPU) of a cable broadcasting receiver. That is, the output rate correctors 505, 506 and 507 decide the time of outputting based on 26.97035 Mbps for 64 QAM channel or decide the time of outputting based on 38.81070 Mbps for 256 QAM channel.

The output rate correctors 505, 506 and 507 transmits the Null-signal to the Null inserters 508, 509 and 510 to output the Null packet if the output rate correctors 505, 506 and 507 receive the full-signal from the FIFO input units 502, 503 and 504.

The Null inserters 508, 509 and 510 output the 200-byte Null packet in response to the Null-signal outputted from the output rate correctors 505, 506 and 507.

The insertion of the Null packet compensates through generating the Null packets as many as the number of packets deleted through filtering in the multiplexer.

The packets finally outputted from the de-multiplexer 500 may have unstable packet timing while passing through filtering, multiplexing and descrambling in the multiplexer and the Cable CARD. If a timing of packet loading the PCR information becomes unstable, the PCR jitter is generated. The allowable jitter range in MPEG is 500 nano-second. Therefore, the PRCR must be corrected to stay the PCR jitter in the allowable jitter range. The PCR correctors 511, 512 and 513 correct the PCR value of a packet having the PCR information among the final-output packets. Also, the PCR correctors 511, 512 and 513 delete the 12-byte pre-header.

The method of correcting the PCR in the PCR correctors 511, 512 and 513 calculates a difference between a value of a LTSID field 211 among the 12-byte pre-header and a counter value received from a current local time stamp generator 402, and corrects the PCR value according to the difference. That is, the difference between the value of the LTSID field 211 and the received value denotes a delay for passing through a corresponding packet from the multiplexer, the Cable CARD and the de-multiplexer. The difference is added to the PCR value to correct the PCR jitter.

As described above, the present invention reduced an amount of data to be processed in the Cable CARD by filtering the programs of each channel selected by the viewer in the receiver, multiplexing the selected programs only to create the multi-streams and transmitting the multi-stream to the Cable CARD.

It is expected that a digital cable TV receiver or a set-top terminal will be used as an A/V gateway in a home. Also, it is expected that single cable TV receiver is used to an application supporting various programs at the same time. However, the current OpenCable standard restricts the number of physical channels to about 5 to 6 to process at the same time. The present invention restricts the amount of data inputted to the Cable CARD differently from restricting the number of the physical channels. Therefore, the present invention may be used to an application supporting various programs at the same time although the cable TV receiver is used as the A/V gateway because the present invention can transmit various programs at the same time if the total amount of the corresponding data is less than 200 Mbps regardless of the number of physical channels.

The present application contains subject matter related to Korean patent application No. KR 2005-0090065, filed in the Korean patent office on Sep. 27, 2005, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. A multiplexing unit for an apparatus of receiving a cable broadcasting program, the multiplexer comprising:
    a transport stream (TS) receiving means for transforming broadcasting stream of channels selected by a viewer to a data block of a predetermined type TS packet by synchronizing at a required operating clock;
    a packet identifier (PID) filtering means for receiving the predetermined type TS packet data outputted from the TS receiving means, analyzing information in a packet identifier (PID) field in a header of the predetermined type TS packet, outputting packets of programs selected by a viewer and dumping remained packets;
    a pre-header generating means for adding a predetermined side of a pre-header to the TS packets passed through the PID filtering means to create a predetermined size of a packet;
    a local time stamp generating means for generating a time stamp value required for a location time stamp field (LTS) of the pre-header generating means;
    an outputting means for receiving the predetermined size of the packets outputted from the pre-header generating means and outputting the received packets in a first-in first-out (FIFO) fashion; and
    an output controlling means for controlling the outputting means to output packets from crashing into one another.

2. The multiplexing unit as recited in claim 1, wherein the predetermined type is a MPEG-2 TS Packet.

3. The multiplexing unit as recited in claim 1, wherein the PID filtering means obtains information about programs selected by a viewer through receiving "program_number"

value of the selected program according to a corresponding channel from a central processing unit of the apparatus of receiving a cable broadcasting program (STB CPU), the "Program_number" value is identical to a value in a program association table (PAT) transmitted within a corresponding channel and the "program_number" value is obtained through service information (SI) transmitted through an out-of-band channel.

4. The multiplexing unit as recited in claim 1, wherein the pre-header includes a local transport stream ID (LTSID) as an identifier field to identify broadcasting streams of each channel, a RES1 and a RES2 field as a reserved field for later use, a HOST_reserved field that is a 16-bit field used for a predetermined purpose in a receiver, a local time stamp (LTS) field that is a 32-bit field assigned to a receiver for managing a MPEG timing, a CableCARD_reserved field that is a 16-bit field used for a predetermined purpose in a Cable CARD, a cycle redundancy check (CRC) field that is a 8-bit field used to determine whether the values in the pre-header are changed or not after passing through the Cable CARD.

5. The multiplexing unit as recited in claim 1, wherein the local time stamp generating means is configured of a predetermined bit counter, operated according to a MPEG reference clock and transmits the generated time stamp value (counter) to a de-multiplexer.

6. The multiplexer unit as recited in claim 1, wherein the output means outputs packets in response to a control signal from the output controlling means to avoid collision of the outputted packets, transmits a full-signal denoting that the output means is filled with the packet when the predetermined size of the packet is completely inputted and transmits an empty-signal denoting that the output means is empty when the predetermined size of the packet is completely outputted from the output means.

7. The multiplexing unit as recited in claim 1, wherein the output controlling means transmits an output-signal to the outputting means that sent the full-signal, waits until the outputting means transmits the empty-signal, and transmits an output-signal to a second output means to output the packet after receiving the empty-signal from the outputting means that previously transmit the full-signal although receiving the full-signals from other outputting means.

8. A de-multiplexing unit for an apparatus of receiving cable broadcasting program, the de-multiplexing unit comprising: a pre-header checking means for checking a field of a pre-header in a descrambled transport stream (TS); an inputting means for storing packets outputted from the pre-header checking means in a FIFO fashion; an output rate correcting means for receiving data storing information from the inputting means, receiving output data rate information of a corresponding channel from a CPU of the apparatus of receiving a cable broadcasting program and deciding a time to output packets; a Null inserting means for outputting a predetermined size of a Null packet in response to a Null-signal from the output rate correcting means; and a program clock reference (PCR) correcting means for correcting a program clock reference value of a packet having a PCR information among the final-outputted packets from the de-multiplexing unit and deleting the pre-header thereof.

9. The de-multiplexing unit as recited in claim 8, wherein the inputting means transmits a full-signal to the output rate correcting means to notice the inputting means is filled up with a single packet when the packet includes a pre-header, and outputs the packet in response to an output-signal from the output data correcting means.

10. The de-multiplexing unit as recited in claim 8, wherein the output data correcting means transmits the Null-signal to the Null inserting means to output the Null packet if the output data correcting means does not receive the full-signal from the inputting means at a time of outputting a packet.

11. The de-multiplexing unit as recited in claim 8, wherein the Null inserting means compensates using Null packets as many as the number of packets deleted in a filtering in a multiplexer.

12. The de-multiplexing unit as recited in claim 8, wherein the PCR correcting means calculates a difference between a LTSID value in a pre-header of a packet having PCR information and a counter value received from a means for generating a current local time stamp and compensates the PCR value as much as the calculated difference.

* * * * *